UNITED STATES PATENT OFFICE.

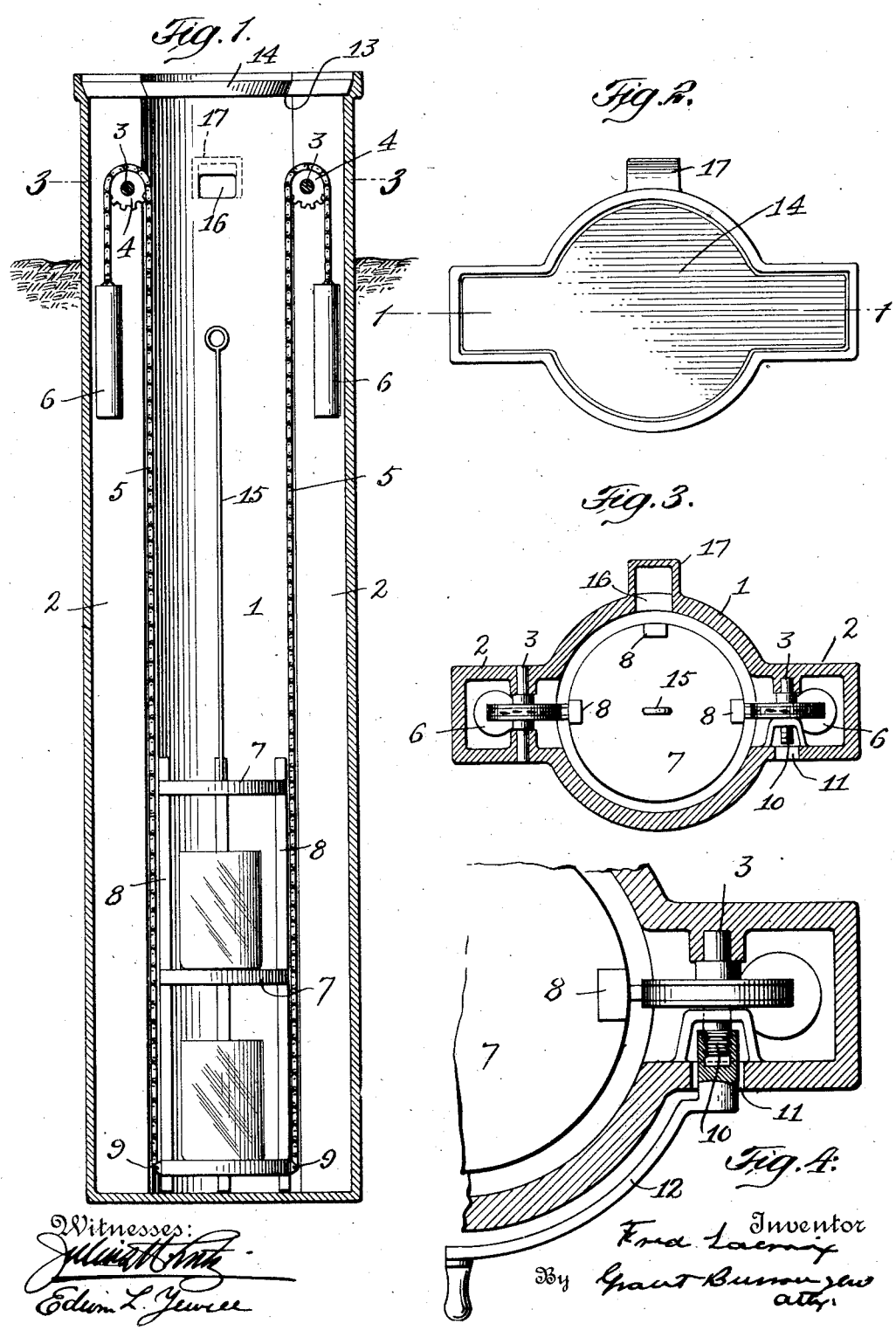

FRED LACROIX, OF BROOKLYN, NEW YORK, ASSIGNOR OF TWO-FIFTHS TO JACOB A. CANTOR, OF NEW YORK, N. Y.

BATTERY-CHUTE.

1,004,282. Specification of Letters Patent. Patented Sept. 26, 1911.

Application filed January 20, 1910. Serial No. 539,192.

*To all whom it may concern:*

Be it known that I, FRED LACROIX, a citizen of the United States, and a resident of Brooklyn, in the county of Kings and State of New York, have invented certain new and useful Improvements in Battery-Chutes, of which the following is a specification.

The invention relates to battery-chutes such as are employed in the instalment of electric signal systems for railways. In these systems numerous batteries comprising wet cells are placed at frequent intervals along the track to provide local currents for energizing switch-controlling magnets. Ordinarily the cells of a battery are placed in a cage and the latter is lowered into a cylindrical casing, or chute, planted in the ground at the side of the track. This chute is of considerable depth so that the battery can be lowered sufficiently into the ground to protect the liquid of the cells from freezing. For the purposes of inspection and renewal of the cells the battery must be frequently raised to the surface of the ground. Ordinarily this is done by attaching a rope or rod to the cage and raising the same by the direct application of main strength. As the battery and cage have considerable weight the efforts of at least two men are required in the operation. Also the battery is often dropped, which is not only a loss of time, labor and material, but the chute must also be cleaned of the acid to prevent corrosion of the metal of which the chute is composed.

The present invention has for its object the provision of means whereby the battery can be easily raised and lowered by the efforts of a single man, and by which the danger of dropping is eliminated. The means employed for carrying out this object consist in the novel construction, combination and arrangement of parts hereinafter described, pointed out in the appended claims and illustrated in the accompanying drawings.

In the drawings, in which similar reference characters designate corresponding parts, Figure 1 is a vertical sectional view on the line 1—1 of Fig. 2 of a battery-chute embodying the invention. Fig. 2 is a plan view. Fig. 3 is a sectional view on the line 3—3 of Fig. 1. Fig. 4 is an enlarged detail sectional view showing the mechanism for raising and lowering the chute.

The main casing 1 of the chute is generally cylindrical in shape and is closed at the bottom. Extending longitudinally of the casing on opposite sides are the wings 2 forming channels or guides. In the upper end of each wing is journaled the shaft 3 on which is keyed the sprocket-wheel 4. Over the latter passes the sprocket-chain 5. The outer end of this chain drops into the channel beneath, where it is attached to the weight 6, and the inner end drops into the main chamber of the casing where it is attached to the battery cage.

In the main chamber of the casing 1 is the battery cage comprising the cell-carrying shelves 7 held together in their proper relative positions by the uprights 8. The latter extend below the lowest shelf to provide feet to support the cage above the floor of the casing when lowered with the cells out of contact with any water that may collect in the bottom of the chute. To the lowest shelf of the cage, as at 9, are attached the inner ends of the chains 5 having the counter-weights 6 attached to their outer ends. When the cage is loaded with battery cells the weight is balanced by the counter-weights so that but little effort is required to raise and lower the cage and there is no danger of it dropping.

One of the shafts 3 has a screw-threaded end 10 inside of the casing and opposite the opening 11 to receive the threaded socket of the crank 12 inserted in said opening. The screw-threaded end of the shaft is located inside of the wall to prevent tampering with the same. The arm of the crank is curved to clear the body of the casing when turned. By means of the crank the shaft 3 with which it is engaged can be turned to rotate the sprocket-wheel 4 on that shaft and through its engagement with the chain 5 the cage carrying the battery can be raised and lowered with but little effort. As the chains 5 are attached at their inner ends to the lower end of the battery-cage, the latter can be raised almost entirely out of the casing so that access can be readily had to its lowest shelf.

In the upper end of the main casing 1 and the wings 2 is the seat 13 for the lid 14. When the battery cage is raised the rod 15 projecting upwardly from the top of the cage engages the lid and raises the same from its seat so that it can be readily lifted from the chute. After the lid has been removed the cage can be raised above the top of the chute so that the cells can be readily inspected and renewed when required. In the upper end of the main casing is the opening 16 through which pass the wires connected with the battery. The opening is protected by the hood 17 projecting over the same.

It is to be observed that the walls of the wings 2 form integral continuations of the wall of the main casing 1, and that the channels in the wings are open on their inner sides to the interior of the main casing. Also, that the projections on the sides of the cover 14 that close the upper ends of the channels in the wings 2 are continuations of the main part of the cover. By this construction of casing and cover the chute is particularly adapted to its purpose, not only in cheapening the cost of manufacture, but in its efficiency to withstand rough usage and to protect its contents against adverse climatic conditions. It is also to be noted that after the cover 14 has been placed in position to close the upper end of the casing, it can only be removed by the application of force to its under side by raising the battery-cage through the action of the crank 12 on the screw-threaded shaft 3. After the crank is removed from the shaft the cover is practically secured in place so that it cannot be removed.

Having thus described my invention, what I claim and desire to secure by Letters Patent is,

1. In a battery-chute, a main casing, wings forming channels extending longitudinally on opposite sides of the main casing with the walls of the wings forming integral continuations of the wall of the main casing, a battery-cage vertically movable in the main casing, wheels journaled in the upper ends of the channels in the wings, chains passing over the wheels connected at their inner ends with the battery-cage, and counterweights in the channels in the wings attached to the outer ends of the chains.

2. In a battery-chute, a main casing, wings forming channels extending longitudinally on opposite sides of the main casing with the walls of the wings forming integral continuations of the wall of the main casing, a continuous cover-seat in the upper ends of the main casing and wings, a cover for the cover-seat comprising a main part to close the upper end of the main casing and projections on its sides to close the upper ends of the wings, a battery-cage vertically movable in the main casing, wheels journaled in the upper ends of the channels in the wings, chains passing over the wheels connected at their inner ends to the battery-cage, and counterweights in the channels of the wings attached to the outer ends of the chains.

3. In a battery-chute, a main casing, wings forming channels extending longitudinally on opposite sides of the main casing with the walls of the wings forming integral continuations of the wall of the main casing, a battery-cage vertically movable in the main casing, shafts journaled in the upper ends of the channels in the sides of the wings with an end of one of the shafts inside of and opposite to an opening in the wall of its wing, sprocket-wheels on said shafts, sprocket-chains passing over the sprocket-wheels connected at their inner ends to the battery-cage, counterweights in the channels of the wings attached to the outer ends of the sprocket-chains, and a crank with a socket to enter the opening in the wall of the wing to engage the end of the shaft opposite such opening and said crank having an outwardly bent handle to clear the main casing when the crank is turned.

4. In a battery-chute, a main casing, wings forming channels extending longitudinally on opposite sides of the main casing with the walls of the wings forming integral continuations of the wall of the main casing, a shaft journaled in the upper end of one of the channels with an end inside of and opposite an opening in the adjacent wall of the wing of the channel, a crank with a socket to enter the opening in the wall of the wing to engage the end of the shaft opposite the opening, a sprocket-wheel on said shaft, a sprocket-wheel journaled in the upper end of the other channel, a battery-cage movable in the casing, sprocket-chains passing over the sprocket-wheels and attached at their inner ends with the lower end of the battery-cage, and counterweights in the channels attached to the outer ends of the sprocket-chains.

In testimony whereof I hereunto affix my signature in the presence of two witnesses.

FRED LACROIX.

Witnesses:
  SOL LEKULSKY,
  WILLIAM A. BOECKEL.

---

Copies of this patent may be obtained for five cents each, by addressing the "Commissioner of Patents, Washington, D. C."